9058X

A. C. Jones,

Spark Arrester,

Patented Aug. 27, 1835.

Nr 12

9658X Aug. 27, 1835 281.

Alfred C. Jones of Portsmouth Virginia

Letters Patent.

The schedule referred to in these Letters Patent and making
part of the same containing a description in the words of the
said Alfred C. Jones himself of his improvement in an
instrument or apparatus for arresting the sparks proceed
-ing from the furnaces of steam engines.

To all whom it may concern.

Figure 1:
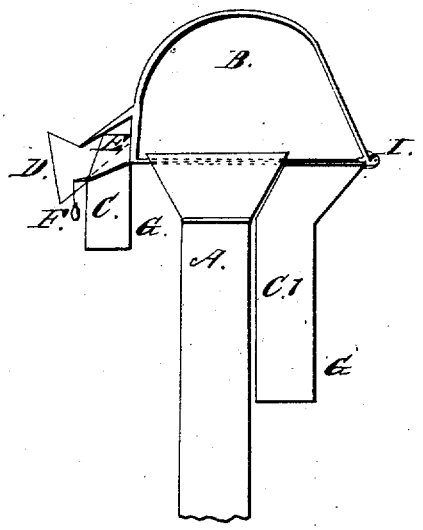
Figure 2:
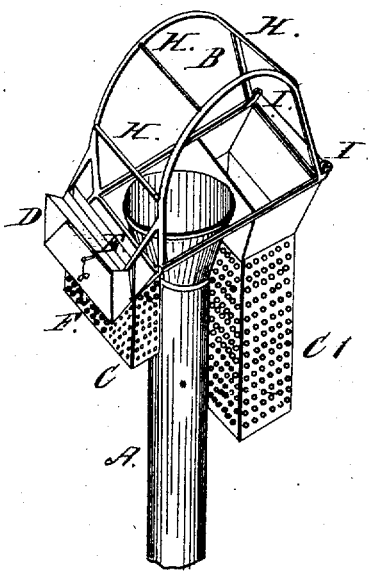
Figure 3:
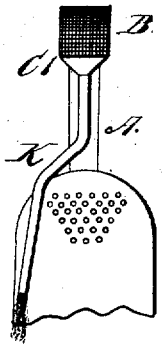

Be it known that I Alfred C. Jones now residing at
Portsmouth in the County of Norfolk and State of Virginia
have invented improvements in the apparatus for arres
-ting the sparks which proceed from the furnaces of steam
engines, and that the following is a full and exact des=
cription thereof refferance being had to the drawings which
accompany and make a part of this specification. Fig 1. Is
a longitudinal section of the apparatus taken vertically
through the chimney Fig 2. Is a perspective view representing
the cap and its appurtinances complete; with the exception
of the wire gauze which is to be strained over the frame but
which has been omitted in the drawing for the more perfect
exhibition of the other parts. Fig 3. is a section of the of the smoke
chamber of a (Locomotive engine) showing the pipe for convey-
ing the sparks to its bottom the same letters serve to designate
similar parts. A. is the smoke pipe or chimney B the cap or
frame which is to be covered with wire gauze C,C. are recepta=
cals for sparks and cinder D a funnel or opening furnished with
a shutter or valve E. which has a conterbalanceing weight F.
attached to it G. G. are sliding doors H.H.H. are cross rods form
-ing a part of the frame work of the cap. I.I. Hinges to admit of the
cap being thrown back to prevent the gauze from cloging with
lampblack

9058X lampblack when the engine is standing; The size of the apparatus
may be varied according to circumstances but as a guide to others I
will mention the dimensions of certain parts which I have
found to answer well in practice. The drawing fig 1. has been
made upon a scale of three fourths of an inch to one foot the whole
width being nineteen inches. The frame of the cap is made of iron
measuring three fourths of an inch by three eights of an inch; the
wire gauze which I have used has fourteen meshes to one inch, and
this I prefer to what is finer as no sparks capable of producing injury will
pass through it. The Funnell D. I have made of tin plate, the boxes
C.C. of sheet iron; I have secured the cap to the funnel of the smoke
pipe in the following manner, a piece of strong sheet iron of a size
proper to form the whole of the foundation or bottom part of the
cap has a hole cut through it of such diameter as allows of the
turning down of the flanch to fit and by which to secure it
near the upper edge of the funnel of the smoke pipe by means
of a hoop and rivets. The frame of the cap rests upon this sheet
iron, the two being secured together by riveting; rows of small
holes are punched through the sheet iron for the purpose of at-
taching the wire gauze thereto. The shutter E. is made self
regulating, the weight F being just heavy enough, or sufficient
to keep it closed when the engine is at rest and it of course closes
whenever the engine is run backward; when running for-
ward the shutter is open, taking the position represented
by the dotted lines. To promote the combustion of the sparks
small holes are punched in the receptacles C.C. Sometimes
only the bottoms are punched for the purpose and a sliding
door or other means of opening the receptacles to clear them
of ashes is provided; or instead of consuming the sparks
in the box C.1. I alter its form as shown by Fig 3. and convey
them by the pipe H. to the lower part of the smoke chamber.

I have thus given a thorough description of the manner
of constructing the apparatus and in so doing have neces
-sarily necessarily mentioned certain parts thereof of which I do not claim to be the inventor. caps of several construction covered with wire gauze having been before used for the same purpose, but I do claim as new and of my invention the open funnel Marked D. in the drawing and the self regulating shutter. or valve, placed therein, so balanced that it will be open and admit air, by the advance of the engine and close when it is at rest and these I claim in all the variations of form of which they are susceptible, whilst they are so constructed as to operate upon the same principals and produce similar effects. I also claim the conveying of the sparks by the pipe K to the bottom of the smoke cham=ber out of the influence of the Boiler flues and the makeing the cap with hinges for the beforementioned purpose.

Witnesses
Jno. Cooke
J. C. Garrison

Alfred C. Jones (Drawing)

Exd.
W.G.C.